Nov. 12, 1957  W. B. JEFFREY ET AL  2,812,986
FLUID PRESSURE BRAKE APPARATUS WITH DIRECT RELEASE FEATURE
Filed Aug. 25, 1955
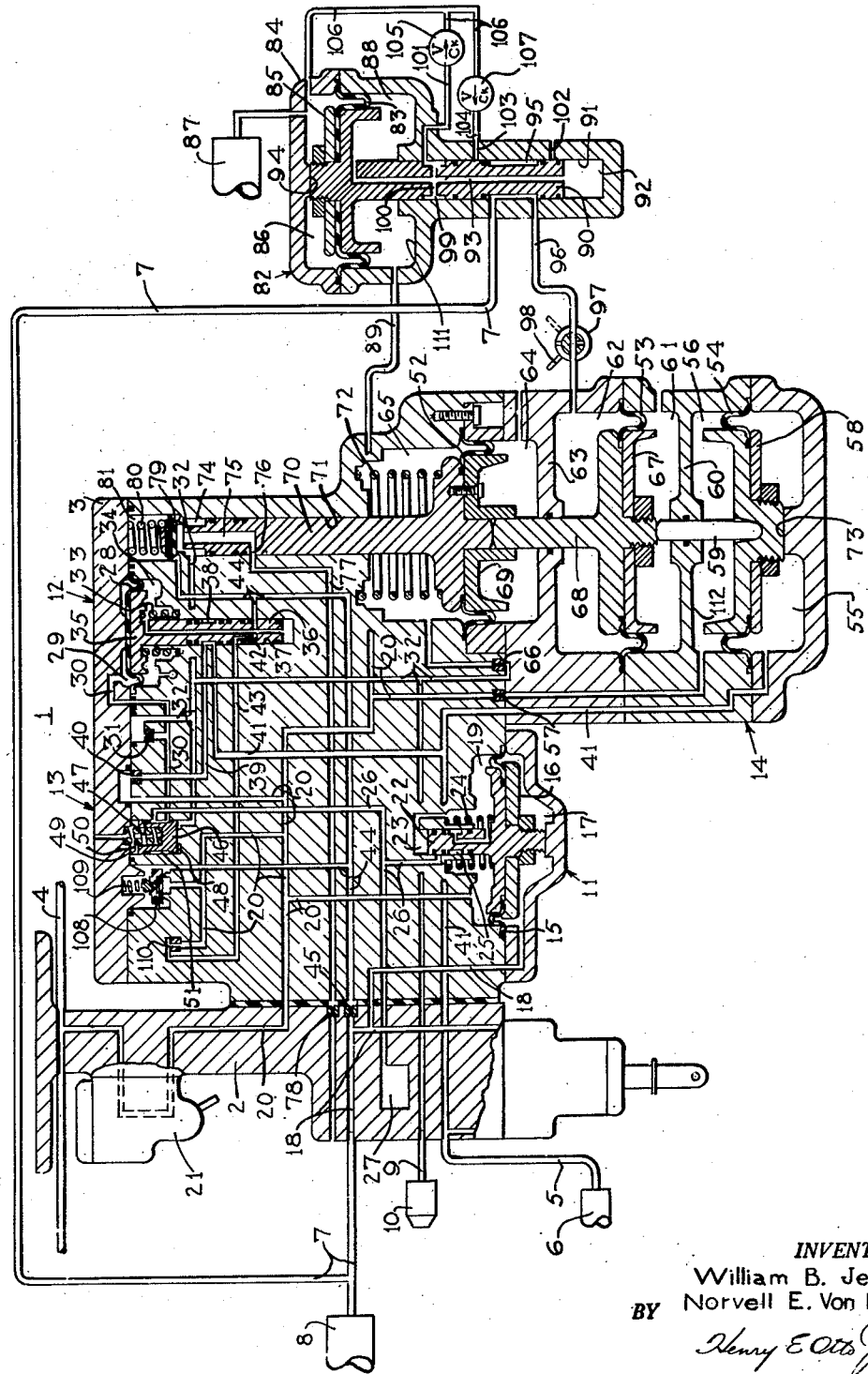
INVENTORS
William B. Jeffrey
Norvell E. Von Behren
BY
Henry E Otto Jr.
ATTORNEY United States Patent Office 2,812,986
Patented Nov. 12, 1957

2,812,986

FLUID PRESSURE BRAKE APPARATUS WITH DIRECT RELEASE FEATURE

William B. Jeffrey, Irwin, and Norvell E. Von Behren, Pittsburgh, Pa., assignors to Westinghouse Air Brake Company, Wilmerding, Pa., a corporation of Pennsylvania Application August 25, 1955, Serial No. 530,446

8 Claims. (Cl. 303—45)

This invention relates to fluid pressure brake apparatus of the graduated release type adapted to control the degree of brake application and release of brakes on a railway car or the like according to the extent of reduction and restoration, respectively, in the pressure of fluid in a brake pipe relative to a datum pressure in a control reservoir; the invention relating more particularly to an apparatus of the above type embodying novel means for providing direct release instead of graduated release.

With apparatus of the graduated application and release type, a partial or graduated release of brakes may be obtained according to the degree of restoration in brake pipe pressure, which is of course desirable. However, in order to effect a complete release of brakes on a particular car of a train, brake pressure must be restored to substantially the datum pressure in the corresponding control reservoir and such release, especially on the rear cars of a long freight train, may require a relatively long period of time because the equipment on each car is simultaneously being recharged from the brake pipe and thus tends to protract the final build-up in brake pipe pressure in the rearward cars and thereby delay a complete release of brakes on such rearward cars.

It is therefore the principal object of this invention to provide an improved brake apparatus of the graduated application and release type in which is embodied a direct release feature whereby the brake apparatus may be operated to effect release of the brakes more uniformly and promptly throughout a long train, irrespective of any delay in build-up of brake pipe pressure on the rearward cars of such train.

According to the invention the improved brake apparatus comprises novel means which operates in response to a slight reduction in brake pipe pressure to vent a diaphragm chamber of an improved service valve device so that the degree of brake application will be controlled according to the extent of the operator-effected reduction in brake pipe pressure below the datum pressure in the control reservoir; said means being operative in response to the subsequent slight increase in brake pipe pressure to supply fluid under pressure to said chamber for biasing the service valve device to a position for effecting a complete release of brakes, irrespective of the rate of brake pipe pressure rise on the particular car; said means also being operative in response to a subsequent reduction in brake pipe pressure at any time prior to (as well as after) completion of such complete release of brakes to again vent said diaphragm chamber to permit operation of the service valve device to reapply brakes to a degree proportional to the differential between brake pipe pressure and said datum pressure.

Other objects and advantages will become apparent from the following more detailed description of the invention and from the accompanying drawing, wherein the single figure is a diagrammatic view of a brake apparatus embodying the invention.

DESCRIPTION

As shown in the accompanying drawing, the improved brake apparatus for each car of a train comprises a brake controlling valve device 1 which, in turn, comprises a pipe bracket 2, on which is suitably mounted a sectionalized casing 3. To the pipe bracket 2 is suitably connected a brake pipe 4, which extends through the train and in which the pressure of fluid is adapted to be varied at the locomotive for controlling brakes in the usual manner. To the pipe bracket 2 are also connected a pipe 5 leading to a control reservoir 6, a pipe 7 leading to an auxiliary reservoir 8, and a pipe 9 leading to a brake cylinder device 10.

Contained within the various sections of the casing 3 are a quick service valve device 11, a charging valve device 12, an interlock valve device 13, and a service valve device 14 which differs from heretofore known service valve devices according to features of the invention hereinafter to be described.

The quick service valve device 11 may, for sake of illustration, comprise an annular flexible diaphragm 15 suitably clamped about its outer peripheral edge between sections of the casing 3 and about its inner edge between portions of a diaphragm follower assemblage 16. The diaphragm 15 is subject at one side to pressure of fluid in a chamber 17 which is constantly open to the auxiliary reservoir 8 via a passage 18 and the pipe 7; and said diaphragm is subject at the opposite side to pressure of fluid in a chamber 19 that is constantly open to the brake pipe 4 via a passage 20 and the usual brake pipe cut-out cock 21. Preferably formed integrally with one of the portions of the diaphragm follower assemblage 16 is a coaxially arranged, cylindrical quick service valve 22 which projects through the chamber 19 and adjacent its projecting end has sealing, slidably guided engagement with the wall of an aligned bore in the casing. A chamber 23, defined in part by the base and surrounding wall of the last mentioned bore, is constantly open to the chamber 19 via a suitable passageway, so that the opposing fluid pressures acting on the diaphragm 15 will be effective on equal areas thereof.

When the pressures of fluid in the chambers 17, 19 are substantially equal, a helical bias spring 24 disposed in chamber 19 and acting on the assemblage 16 urges the valve 22 to a normal position, in which it is shown in the drawing, and in which an elongated annular cavity 25 formed in said valve and constantly open to the chamber 19 is out of registry with a passage 26 that leads to a quick service volume 27.

The charging valve device 12 may, for sake of illustration, comprise a flexible diaphragm 28 that is suitably clamped about its outer peripheral edge between sections of the casing. The diaphragm 28 is subject at one side to pressure of fluid in a chamber 29 that is constantly open to the brake cylinder pipe 9 via a passage 30, a combination continued quick service reduction and charging valve blowdown control choke 31, and a brake cylinder passage 32. The diaphragm 28 is subject at the opposite side to pressure of a helical bias spring 33 disposed in an atmospheric chamber 34 and acting on said diaphragm through the medium of a diaphragm follower 35; said follower preferably being formed integrally with a coaxially arranged, cylindrical charging valve 36 that extends through the chamber 34 and has sealing, slidably guided engagement with the wall of an aligned bore 37 in the casing.

When the chamber 29 is devoid of fluid under pressure, the spring 33 is effective to hold the charging valve 36 in a charging position, in which it is shown in the drawing. In this position, an elongated annular cavity 38 formed in valve 36 connects a passage 39, that is constantly open to the brake pipe passage 20 via a control reservoir combined charging and overcharge dissipation choke 40, with a passage 41 leading to the control reservoir pipe 5; and also a port 42 formed in valve 36 connects a charging passage 43 with a passage 44 that is open to the auxiliary reservoir passage 18 via a brake cylinder application choke 45.

The interlock valve device 13 may comprise a generally cylindrical shuttle or interlock valve 46 having sealing, slidably guided engagement with the wall of a bore 47 in the casing. The valve 46 is subject at one end to pressure fluid in a pressure chamber 48 that is constantly open to a branch of the brake cylinder passage 32. The valve 46 is recessed at the opposite end to accommodate a helical regulating spring 49 that is disposed in an atmospheric chamber 50 and is effective when brake cylinder pressure in the chamber 48 is below a chosen value, such as 9 p. s. i., to hold said valve member in a normal position, in which it is shown in the drawing. With the valve 46 in this position, an elongated annular cavity 51 formed therein connects a branch of the passage 26 with a branch of the passage 30.

According to the invention, the service valve device 14 comprises three spaced-apart, coaxially arranged, annular flexible diaphragms 52, 53, 54, all of which are suitably clamped about their respective outer peripheral edges between sections of the casing 3; said diaphragms being cooperably, though not positively, connected so as to form a diaphragm stack, as will be understood from subsequent description. The diaphragm 53 is intermediate the diaphragms 52 and 54 and may, for sake of illustration, be of the same effective area as the diaphragm 54; the effective area of the latter being larger than that of the diaphragm 52 for reasons hereinafter to be explained.

At the side of the diaphragm 54 farthest from the diaphragms 53, 52 is a chamber 55 that is constantly open to the control reservoir 6 by way of a branch of the control reservoir passage 41; and at the opposite side of said diaphragm 54 is a chamber 56 that is open by way of a baffle choke 57 to a branch of the brake pipe passage 20. A diaphragm follower assemblage 58 is suitably clamped about the inner peripheral edge of the annular diaphragm 54. A cylindrical operating stem 59, arranged coaxially with the diaphragm 54 and adapted at one end to abuttingly engage the side of the follower assemblage 58 adjacent the chamber 56, extends through said chamber and projects through an aligned bore in a casing partition 60 and into an atmospheric chamber 61 at one side of the diaphragm 53; said stem having sealing, slidably guided engagement with the wall of said bore. At the opposite side of diaphragm 53 is a chamber 62 which is separated by a casing partition 63 from an atmospheric chamber 64 at one side of diaphragm 52; and at the opposite side of the latter diaphragm is a chamber 65 which is constantly open to the brake cylinder device 10 via a baffle choke 66 and a branch of brake cylinder passage 32. Suitably clamped about the inner edge of the diaphragm 53 is a diaphragm follower assemblage 67, one side of which is adapted for abutting engagement with the projecting end of the operating stem 59. Preferably formed integrally with one of the parts of the follower assemblage 67 is a coaxially arranged follower stem 68 which projects through chamber 62 and through an aligned bore in the casing partition 63 into the chamber 64; said stem having sealing, slidably guided engagement with the wall of said bore. The follower stem 68 is adapted at its projecting end to abuttingly engage the adjacent side of a diaphragm follower assemblage 69 which is suitably clamped about the inner edge of the annular diaphragm 52. Preferably formed integrally with one of the parts of the follower assemblage 69 is a coaxially arranged cylindrical service valve 70 which has sealing, slidably guided engagement with the wall of an aligned bore 71 formed in the casing and opening into the chamber 65.

A helical spring 72 in chamber 65 acts on the follower assemblage 69 for urging the service valve 70 to a brake release position, in which it is shown in the drawing, and which position is defined by abutting contact of the follower assemblage 58 with a stop surface 73 formed in the end wall of chamber 55; it being noted that said spring 72 urges the follower assemblage 69 into abutting contact with stem 68 which, in turn, acts through the medium of the follower assemblage 67 and stem 59 on the follower assemblage 58.

The service valve 70 has an elongated annular cavity 74 which is defined by a reduced diameter portion of said valve adjacent its projecting end and is constantly open to a branch of brake cylinder passage 32; and said valve also has a bore-like opening 75 that extends coaxially inward from said projecting end and is joined to a radial port 76 that is open to the bore 71. When the valve 70 is in its above-defined release position, the cavity 74 is open by way of the opening 75 and port 76 to an exhaust passage 77 that leads from the bore 71 to atmosphere and contains a brake cylinder release choke 78, which controls the rate at which fluid under pressure may be released from the brake cylinder device 10 to atmosphere via the communication just described. Also, with the valve 70 in release position, the projecting end thereof is out of contact with and spaced apart from a coaxially arranged brake cylinder supply check valve 79 which is held seated, as shown, by pressure of a helical spring 80 and of fluid in a chamber 81 open to the auxiliary reservoir 8 via a branch of the passage 44 and the choke 45.

According to the invention, a direct release valve device 82 is further provided which may, for sake of illustration, comprise an annular flexible diaphragm 83 suitably clamped about its outer edge between sections of a valve casing 84 and about its inner edge between parts of a diaphragm follower assemblage 85. The diaphragm 83 is subject at one side to pressure of fluid in a chamber 86 that is constantly open to a volume 87, although, if preferred, the chamber 86 may be enlarged so as to eliminate the need for such separate volume; and said diaphragm is subject at the opposite side to pressure of fluid in a chamber 88 that is constantly open to the brake pipe 4 by way of a pipe 89 and a branch of brake pipe passage 20. Preferably formed integrally with one of the parts of the diaphragm follower assemblage 85 is a coaxially arranged, cylindrical direct release valve 90 that has sealing, slidably guided engagement with the wall of a bore 91 formed in the casing 84 adjacent the chamber 88. Defined between the base of bore 91 and the adjacent end of valve 90 is a chamber 92 which is constantly open to the chamber 88 via a generally axial opening 93 in said valve so that opposing fluid pressures acting on the diaphragm 83 will be effective on equal areas thereof unaffected by the diameter of the cylindrical valve 90.

When brake pipe pressure as noted in chamber 88 exceeds the opposing pressure in chamber 86, the diaphragm 83 is adapted to deflect and shift the direct release valve 90 to a direct release position, in which it is shown in the drawing, and which position is defined by engagement of the follower assemblage 85 with a suitable stop 94 provided in the end wall of chamber 86. With the valve 90 in this position, an elongated annular cavity 95 formed in the outer periphery of said valve is so disposed as to connect a branch of the auxiliary reservoir pipe 7 with a pipe 96 that leads to the chamber 62 of the service valve device 14 by way of a normally open cock 97; said cock being manually operable by a handle 98 to a closed position, for venting said chamber 62 and closing off the latter from the pipe 96. Also, with the valve 90 in direct release position, an elongated annular cavity 99 that is formed in said valve intermediate the cavity 95 and chamber 88 and is constantly open via plurality of radial ports 100 to the opening 93 is so disposed as to connect said opening and hence the chamber 88 with a pipe 101. Also, the valve 90 in release position laps off an exhaust port 102 formed in the casing 84 and leading from the bore 91 to atmosphere; and said valve also laps off a port 103 to which is connected a pipe 104.

A check valve 105 of any well-known type is interposed between the pipe 101 and a pipe 106 leading to the chamber 86 for permitting flow from pipe 101 to said chamber and preventing flow in the reverse direction. A check valve 107 of any well-known type is interposed between the pipe 104 and a branch of the pipe 106 for permitting flow from the chamber 86 and pipe 106 to the pipe 104 and preventing flow in the reverse direction, for reasons hereinafter to be described.

OPERATION

Initial charging of the apparatus

Assuming initially that the apparatus is devoid of fluid under pressure, the various components thereof will be in the respective positions in which they are shown in the drawing, with the possible exception of the direct release valve device 82.

To initially charge the apparatus, fluid under pressure is supplied to the brake pipe at the locomotive in the usual manner. Some of the fluid thus applied to the brake pipe will, on a particular brake-equipped car, flow via a branch of the brake pipe 4, the cock 21, and one branch of brake pipe passage 20 to the pipe 89 and chamber 88 of the direct release valve device 82 for promptly shifting direct release valve 90 to its previously defined direct release position, in which it is shown, for supplying fluid under pressure via said chamber 88, opening 93, and cavity 99 to pipe 101; whence such fluid will flow past check valve 105 and via pipe 106 to the chamber 86 for charging the latter and also charging the volume 87. Also, with direct release valve 90 in this position, fluid supplied to the auxiliary reservoir 8 in the manner presently to be described, will flow via pipe 7 and direct release valve cavity 95 to pipe 96 and thence through cock 97 in open position to chamber 62 of the service valve device 14. Some fluid under pressure will also flow via another branch of passage 20 to the under side of a preferably disc-shaped auxiliary reservoir charging check valve 108 and unseat the latter against pressure of a helical spring 109 and then flow via one branch of passage 44 and at the rate controlled by the choke 45 to the passage 18 for charging the auxiliary reservoir 8 and also charging the chamber 17 of the quick service valve device 11 at a relatively rapid rate.

Meanwhile, some of the fluid under pressure supplied to brake pipe passage 20 will flow via still another branch thereof and at the rate controlled by the control reservoir charging choke 40 to the passage 39 and thence via charging slide valve cavity 38 and respective branches of the passage 41 to the control reservoir 6 and to the chamber 55 of the service valve device 14. Also, some fluid under pressure will flow via yet another branch of brake pipe passage 20 and at the rate controlled by an auxiliary reservoir final or slow charging choke 110 to the passage 43 and thence via port 42 in the charging valve 36 to the auxiliary reservoir passage 44 and thence via choke 45 to the auxiliary reservoir 8 and quick service valve chamber 17; it being noted that the auxiliary reservoir will be charged primarily past the auxiliary reservoir charging check valve 108, as above described, until auxiliary reservoir pressure is a chosen degree, such as 1.7 p. s. i., below brake pipe pressure, as determined by the bias effect of spring 109, whereupon final charging of the auxiliary reservoir to equality with brake pipe pressure will be solely by way of and at the slower rate controlled by the choke 110.

It is to be noted that the combined effect of brake pipe pressure in chamber 56 and auxiliary reservoir pressure in chamber 62 of the service valve device 14 will preponderate over the opposing effect on the service diaphragm stack of control reservoir pressure in chamber 55, and hence the service valve 70 will be maintained in brake release position throughout initial charging. With the service valve 70 in this position, the brake cylinder device 10 will be open to atmosphere via a brake cylinder release communication defined by pipe 9, passage 32, service slide valve cavity 74, opening 75, port 76, passage 77 and brake cylinder release choke 78. With the brake cylinder passage 32 thus vented, the chambers 48, 29 of the interlock valve device 13 and charging valve device 12, respectively, will be vented via said brake cylinder passage with the result that the interlock valve 46 and the charging valve 36 will be maintained in their respective normal positions, in which they are shown.

Also, during initial charging the pressure of fluid in the quick service valve chamber 19, which is in unrestricted communication with the brake pipe passage 20, will increase more rapidly than the opposing pressure in chamber 17 which is charged at a restricted rate from said brake pipe passage. Hence, throughout initial charging, the quick service valve 22 will be maintained in normal position, in which it is shown.

From the foregoing, it will be apparent that upon completion of initial charging, the various components of the brake apparatus will be in the respective positions in which they are shown in the drawing, and that the volume 87 and chamber 86 of the direct release valve device 82 will be charged past check valve 105 to substantially the same pressure as that in the brake pipe.

It may be noted that if the handle 98 of cock 97 is in closed instead of open position, the chamber 62 of the service valve device 14 will not be charged with fluid under pressure from the auxiliary reservoir 8; however, brake pipe pressure in chamber 56 of said valve device will increase at a more rapid rate than control reservoir pressure in chamber 55, and hence the service valve 70 will nevertheless be maintained in its brake release position, as above described.

Effecting an application of brakes

To initiate an application of brakes, the operator effects a reduction in the pressure of fluid in the brake pipe at the locomotive to a chosen value below its normal full charge value and corresponding substantially to the degree of application desired, in the well-known manner.

On a particular car, this reduction in brake pipe pressure will cause a reduction in pressure in the brake pipe passage 20 and hence in the chamber 19 of the quick service valve device 11, with the result that diaphragm 15 will be deflected against resistance of spring 24 by preponderant auxiliary reservoir pressure in chamber 17 for shifting the quick service valve 22 to a quick service position. With the valve 22 in this position, fluid under pressure will be locally released from the brake pipe 4 by flow via passage 20, chamber 19, cavity 25, and passage 26 into the quick service volume 27 at a rapid rate for causing an initial limited degree of local quick service reduction in brake pipe pressure; and some of such fluid will flow via another branch of passage 26 and through cavity 51 of the interlock valve 46 in normal position and through passage 30 to the chamber 29 of the charging valve device 12 for deflecting the diaphragm 28 of the latter device against resistance of spring 33 and thereby shifting the charging valve 36 to a cut-off position, in which the cavity 38 and port 42 are disconnected from the passages 39, 43, respectively, for preventing backflow of fluid under pressure from the control reservoir 6 and auxiliary reservoir 8 into the brake pipe 4 via the respective charging communications described during initial charging. After the quick service volume 27 and charging valve chamber 29 have been charged, as just described, fluid under pressure will continue to be released from the brake pipe 4 by flow from the passage 30 into the brake cylinder passage 32 at the rate controlled by the continued quick service choke 31.

Meanwhile, according to a feature of the invention, the pressure in chamber 88 of the direct release valve device 82 will reduce with brake pipe pressure, but the check valve 105 will be effective to bottle up fluid in the volume 87 and chamber 86. Hence as soon as brake pipe pressure in chamber 88 is reduced slightly below volume pressure in chamber 86, the diaphragm 83 will deflect downwardly and shift the direct release valve 90 from its direct release position to a cut-out position, defined by engagement of a depending annular rim on the follower assemblage 85 with a stop 111 provided on the end wall of chamber 88. With the valve 90 in this other position, the cavity 95 will be so disposed as to disconnect the auxiliary reservoir 8 from the pipe 96 and open the latter to exhaust port 102 for releasing fluid under pressure from the chamber 62 of the service valve device 14 at a rapid rate. Also with valve 90 in this position, the valve cavity 99 will be so disposed as to disconnect the pipe 101 from the brake pipe and chamber 88 and open the latter to the pipe 104 for permitting release of fluid under pressure from the volume 87 and chamber 86 into the brake pipe 4 via pipe 106, check valve 107, pipe 104, cavity 99, opening 93, chamber 88 and brake pipe passage 20. Thus, with the direct release valve 90 in its cut-out position, chamber 62 of the service valve device 14 will be promptly vented to atmosphere, and also pressure in the volume 87 and chamber 86 will blow down past the check valve 107 and into the brake pipe at substantially the same rate as, and to the same degree as, brake pipe pressure is being reduced.

With chamber 62 of the service valve device 14 thus vented, the diaphragm 53 will be subject at both sides to atmospheric pressure; and hence whenever brake pipe pressure is reduced for effecting an application of brakes, said diaphragm and the follower assemblage 67 will act merely as a connecting linkage in the diaphragm stack and will impart no force to said stack.

When brake pipe pressure in chamber 56 has reduced in excess of a predetermined degree (as determined substantially by the bias effect of spring 72 on the diaphragm stack), control reservoir pressure in chamber 55 acting on the diaphragm 54 will deflect said diaphragm against opposition of such reduced brake pipe pressure in chamber 56 and, through the medium of the follower assemblage 58, stem 59, follower assemblage 67 and its stem 68, and follower assemblage 69, shift the service valve 70 to a brake application position, against resistance of spring 72 and the spring 80; said position being defined by engagement of the follower assemblage 58 with a stop 112 provided in the end wall of chamber 56. In brake application position, the projecting end of the service valve 70 sealingly engages the check valve 79 and holds same unseated against resistance of the spring 80 for permitting fluid under pressure to flow from the auxiliary reservoir 8 to the brake cylinder device 10 at the rate controlled by the brake cylinder application choke 45 via passage 44, chamber 81, the unseated valve 79, cavity 74 and brake cylinder passage 32.

Fluid under pressure will continue to be supplied from the auxiliary reservoir 8 to the brake cylinder device 10 in the manner just described until brake cylinder pressure, as noted in the chamber 65 of the service valve device 14, has increased to a value substantially proportionate to the degree of operator-effected chosen reduction in brake pipe pressure; whereupon a slight further increase in brake cylinder pressure will cause the diaphragm stack to be deflected against resistance of control reservoir pressure in chamber 55 for shifting the service valve 70 to a lap position, intermediate its brake application and release positions. With service valve 70 in lap position, the check valve 79 is seated for cutting off supply of fluid under pressure to the brake cylinder device 10; and the projecting end of said service valve sealingly engages said check valve for sealing off the exhaust opening 75 from the brake cylinder device 10. Hence, in the lap position of the service valve 70, fluid will be bottled up in the brake cylinder device 10 at a pressure corresponding substantially to the chosen degree of reduction in brake pipe pressure.

Meanwhile, when brake cylinder pressure as noted in chamber 48 of the interlock valve device 13 had increased to the illustrative 9 p. s. i. corresponding to a chosen minimum degree of brake application, the valve 46 will have been shifted against resistance of spring 49 from its normal position to a cut-off position, in which cavity 51 is so disposed that the quick service volume 27 is disconnected from passage 30 for terminating the above-described continued quick service reduction in brake pipe pressure. Thereafter, brake cylinder pressure bleeding back through the choke 31 will maintain the charging valve chamber 29 charged for maintaining the charging valve 36 in its cut-off position.

It is to be noted that the effective area of the diaphragm 54 of the service valve device 14 is preferably about three times that of the diaphragm 52 so that for a 1 p. s. i. change in brake pipe pressure in chamber 56 relative to control reservoir pressure in chamber 55, the diaphragm stack and service valve 70 will operate to effect a change of about 3 p. s. i. in brake cylinder pressure as noted in chamber 65. The effective area of the diaphragm 53 is not critical and may, if desired, be identical with that of the diaphragm 54; the diaphragm 53 should be of sufficient area, however, so that when auxiliary reservoir pressure is effective thereon, under conditions hereinafter to be described, the diaphragm stack and service valve will be shifted to release position irrespective of the rate of build-up in brake pipe pressure in chamber 56, in relation to rate of decrease in brake cylinder pressure in chamber 65.

*Effecting a release of brakes*

In order to initiate a complete release of brakes throughout the train, the operator causes fluid under pressure to be supplied to the brake pipe at the locomotive, in the well-known manner. The consequent increase in brake pipe pressure in chamber 56 of the service valve device 14 on a particular car will cause the corresponding diaphragm stack to shift downwardly and thereby carry the service valve 70 to its brake release position for releasing fluid under pressure from the brake cylinder device 10 and chamber 65 to atmosphere via passage 32, cavity 74, opening 75, exhaust passage 77 and brake cylinder release choke 78.

Also, according to the invention, during this increase in brake pipe pressure, as noted in chamber 88 of the direct release valve device 82, the check valve 107 will prevent a corresponding increase in pressure in the volume 87; and hence increasing brake pipe pressure will be effective to deflect diaphragm 83 against resistance of the pressure of fluid trapped in the chamber 86 and volume 87, with the result that valve 90 will be shifted promptly to its direct release position, in which it is shown; it being noted that said valve 90, prior to such shifting, was in its cut-out position, in which pipe 104 is connected via cavity 99 and opening 93 to brake pipe chamber 88. With the valve 90 in direct release position, fluid under pressure will be supplied promptly from the auxiliary reservoir 8 to the chamber 62 via slide valve cavity 95 for so biasing the service valve diaphragm stack as to cause the service valve 70 to be maintained in its brake release position for effecting a complete and so-called direct release of brake cylinder pressure, and hence of brakes, at the maximum rate permitted by the brake cylinder release choke 78 even if, as on a car near the rear of a long freight train, the rate of brake pipe pressure rise is very slow due to frictional resistance to flow through the brake pipe and to demands made on the brake pipe in recharging the auxiliary reservoirs on the forward cars via the respective auxiliary reservoir charging check valves 108 on such foward cars.

It should be noted, by way of contrast, that if apparatus of the graduated release type heretofore propose for passenger cars (and not embodying a "retarded recharge" or "retarded release" feature) is used in freight service, the rate of release of brakes on the rear cars of a long freight train will be determined by the rate of brake pipe pressure rise on such cars if, as will generally be the case, the latter rate is slower than the rate at which brake cylinder pressure could be released via the corresponding release chokes 78; and this slow rate of brake pipe pressure rise will result in delayed complete release of brakes throughout the train. With the improved apparatus, however, as soon as brake pipe pressure is increased slightly (just enough to create a differential across diaphragm 83 sufficient to shift valve 90 to direct release position), the brakes on each car will release at the maximum rate permitted by the respective brake cylinder release chokes 78, with the result that the brakes will be released more nearly uniformly and more promptly throughout the train, for thereby desirably permitting the train to get under way more promptly after initiation of a brake release.

Meanwhile, when the combined effect of increasing brake pipe pressure and pressure of spring 24 in chamber 19 of the quick service valve device 11 is sufficient to overcome the opposing effect on the diaphragm 15 of auxiliary reservoir pressure in chamber 17, said diaphragm will deflect and shift quick service valve 22 to its normal position for cutting off the brake pipe from the quick service volume 27, for it will be recalled that the auxiliary reservoir 8 cannot be recharged via check valve 108 to a value greater than 1.7 p. s. i. below brake pipe pressure.

Thereafter, when brake cylinder pressure in chamber 48 of interlock valve device 13 reduces below the illustrative 9 p. s. i., the spring 49 will shift the valve 46 to its normal position, in which it is shown, for causing fluid under pressure bottled up in the quick service volume 27 to flow via passage 26, cavity 51, and passage 30 to the chamber 29 of the charging valve device 12 for holding the charging valve 36 in its cut-off position until pressure in said quick service volume and chamber 29 has substantially equalized into the vented brake cylinder device 10 at the rate controlled by the choke 31; whereupon the charging valve 36 will be shifted to its charging position for reconnecting the brake pipe with the auxiliary reservoir 8 and control reservoir 6, via communications described in connection with initial charging. It should be noted that by virtue of the restricted flow capacities of the chokes 40, 110, no appreciable reduction in pressures in the control reservoir 6 and auxiliary reservoir 8, respectively, will thereafter occur, even if brake pipe pressure has not been fully restored to its full charge value, and that any slight depletion which may occur will be made up as and when the brake pipe is charged to its full charge value.

It will now be noted that direct release valve device 82 responds to a slight increase in brake pipe pressure on a particular car to cause operation of the corresponding service valve device 14 to effect a complete release of brakes on said car at the maximum rate permitted by the respective brake cylinder release choke 78, irrespective of the position of said car in the train.

If the operator does not desire to completely release brakes throughout the train, however, or if he desires to reapply brakes before brakes have been completely released, he need merely effect a reduction in brake pipe pressure at the locomotive and brakes will be reapplied according to the differential between reduced brake pipe pressure and control reservoir pressure, as will now be explained.

On each car, when the direct release valve 90 moves to direct release position in response to an increase in brake pipe pressure, as already described, fluid under pressure will be supplied from the brake pipe passage 20 to the chamber 86 and volume 87 via slide valve cavity 99 and check valve 105, with the result that pressure of fluid in said volume and chamber on such car will increase at substantially the same rate as and to the same degree as, brake pipe pressure at said car; and in view of this, the operator may interrupt a release of brakes and effect a reapplication of brakes to any desired degree greater than that then still in effect merely by effecting a reduction in brake pipe pressure at the locomotive of at least a small degree sufficient to cause brake pipe pressure on the respective cars and hence in chamber 88 of each car to be reduced slightly below the pressure of fluid then trapped in chamber 86 on such car by operation of the corresponding non-return check valve 105; whereupon the diaphragm 83 will deflect and shift the direct release valve 90 to its previously defined cut-out position, in which supply of fluid under pressure from the auxiliary reservoir 8 to the chamber 62 is terminated and the latter is promptly vented via slide valve cavity 95 and exhaust port 102. With the chamber 62 thus vented, the service diaphragm stack will operate to shift the service valve 70 successively to its brake application position and then to its lap position for providing in the brake cylinder device 10 fluid at a pressure substantially proportional to the differential between brake pipe pressure in chamber 56 and control reservoir pressure in chamber 55, in the manner already fully described.

If under certain conditions of service, it is desired to provide graduated release of brakes, the handle 98 of cock 97 is moved to closed position for disconnecting the pipe 96 from the chamber 62 and maintaining the latter open to atmosphere. Under such condition, operation of the direct release valve device 82 will have no effect on operation of the service valve device 14, and the latter will operate to control supply of fluid under pressure to and release of fluid under pressure from the brake cylinder device 10 according to the degree of reduction and restoration, respectively, in brake pipe pressure relative to the datum pressure in the control reservoir 6. The cock 97 thus desirably permits rapid changeover or selection of either graduated release or direct release according to intended conditions of service.

*Summary*

It will now be seen that the improved brake apparatus comprises a direct release valve device 82 which responds to a slight reduction in brake pipe pressure to promptly vent a chamber 62 of the service valve device 14 so that brakes may be controlled according to the degree of chosen reduction in brake pipe pressure below a datum pressure in the control reservoir 6, and which responds to a subsequent slight increase in brake pipe pressure to charge said chamber 62 to cause operation of said service valve device to completely release brakes despite any delay in build-up in brake pipe pressure on a particular car, for thereby assuring that brakes will be released more nearly uniformly and promptly throughout a long train.

It will also be seen that even though a complete release of brakes has been initiated by operation of the direct release valve device 82 in response to an increase in brake pipe pressure, such complete release of brakes may be terminated at any time prior to completion, and brakes reapplied to a desired degree, by effecting a reduction in brake pipe pressure and thus actuating the direct release valve device to vent chamber 62 so that the service valve device 14 may operate to reapply brakes to the desired degree corresponding to the differential between brake pipe pressure and control reservoir pressure.

It will also be seen that the apparatus may be conditioned to cut out the optional direct release feature and provide graduated release of brakes by merely operating a normally open cock 97 to a closed position, in which the direct release valve device 82 is cut off from the chamber 62 and the latter is maintained open to atmosphere.

Having now described the invention, what we claim as new and desire to secure by Letters Patent, is:

1. A fluid pressure brake apparatus, comprising, in combination, a normally charged brake pipe; a brake cylinder; means providing a chamber; a service valve device comprising a plurality of coaxially arranged movable abutments so arranged as to be operable as a stack and valve means controlled by said stack, said stack being subject to pressures of fluid in said brake pipe and in said brake cylinder and in said chamber, all of which pressures act on said stack in opposition to a datum pressure corresponding to the normal full charge value of brake pipe pressure, said stack being responsive to a reduction in brake pipe pressure below said datum pressure while said chamber is vented to cause said valve means to provide in said brake cylinder fluid at a pressure substantially proportional to said reduction in brake pipe pressure and responsive to a subsequent increase in brake pipe pressure to cause said valve means to selectively effect a graduated release of brake cylinder pressure to a degree corresponding to the extent of brake pipe pressure increase or effect a complete release of brake cylinder pressure according to whether said chamber is then vented or is charged with fluid under pressure, direct release valve means normally responsive to a slight reduction in brake pipe pressure to vent said chamber and normally responsive to a subsequent slight increase in brake pipe pressure to supply fluid under pressure to said chamber and means for selectively connecting said chamber to said direct release valve means or to atmosphere in by-pass of said direct release valve means for conditioning said service valve device to provide direct release or graduated release of brake cylinder pressure, respectively.

2. A fluid pressure brake apparatus comprising, in combination, a normally charged brake pipe, a brake cylinder, means defining a chamber, a service valve device comprising a plurality of coaxially arranged movable abutments so arranged as to be operable as a stack and service valve means controlled by said stack, said stack being subject to pressures of fluid in said brake pipe and in said brake cylinder and in said chamber, all of which pressures act on said stack in opposition to a datum pressure corresponding to the normal full charge value of brake pipe pressure, said stack being responsive to a reduction in brake pipe pressure below said datum pressure while said chamber is vented to cause said service valve means to provide in said brake cylinder fluid at a pressure substantially proportional to said reduction and responsive to a subsequent increase in brake pipe pressure to move to a brake release position for releasing brake cylinder pressure, a volume for storing fluid under pressure, a first one-way flow communication through which fluid under pressure may flow only from said brake pipe to said volume, a second one-way flow communication through which fluid under pressure may flow only from said volume to said brake pipe, and direct release valve means responsive to a reduction in brake pipe pressure below the pressure in said volume to vent said chamber and disestablish said first communication and establish said second communication, said direct release valve means being responsive to a subsequent increase in brake pipe pressure above volume pressure to disestablish said second communication and establish said first communication and supply fluid under pressure to said chamber for causing said service valve means to be held in its brake release position for completely venting the brake cylinder irrespective of the rate and degree of increase in brake pipe pressure.

3. The combination according to claim 2, including a cock device interposed between said release valve means and chamber and normally in an open position for permitting pressure of fluid in said chamber to be controlled by operation of said direct release valve means, said cock device being operable to a closed position for disconnecting said direct release valve means from said chamber and maintaining the latter vented, such that with said cock device in closed position said stack so controls operation of the service valve means as to release brake cylinder pressure to a degree proportional to the degree of increase in brake pipe pressure, whereby brakes will be released on the direct release principle or on the graduated release principle according to whether said cock device is in its open or closed position, respectively.

4. A fluid pressure brake apparatus comprising a normally charged brake pipe; a brake cylinder; an auxiliary reservoir; means defining a chamber; a service valve device comprising three coaxially arranged movable abutments cooperable as a stack and service valve means controlled by said stack, one of said movable abutments being subject at one side to a constant control pressure corresponding to the normal full charge value of brake pipe pressure and at the opposite side to brake pipe pressure, another of said movable abutments being subject at one side to atmospheric pressure and at the opposite side to pressure of fluid in said chamber, and the third of said movable abutments being subject at one side to atmospheric pressure and at the opposite side to brake cylinder pressure, such that the pressures of fluid in said brake pipe, brake cylinder and chamber act on said stack in opposition to said control pressure, said stack being responsive to a chosen reduction in brake pipe pressure below control pressure for causing said service valve means to supply fluid from said auxiliary reservoir to said brake cylinder at a pressure corresponding to the extent of said chosen reduction, said stack being responsive to a subsequent increase in brake pipe pressure to move to a brake release position for causing said service valve means to release fluid under pressure from said brake cylinder while closing off the latter from the auxiliary reservoir; and direct release valve means responsive to a slight reduction in brake pipe pressure to vent said chamber, and responsive to a subsequent slight increase in brake pipe pressure to supply fluid under pressure from said auxiliary reservoir to said chamber for maintaining said stack in its said brake release position, for causing a complete release of brake cylinder pressure irrespective of the rate and degree of increase in brake pipe pressure.

5. In a fluid pressure brake apparatus, the combination of a normally charged brake pipe, means defining a chamber, a valve device normally in one position for performing one control operation and responsive to a reduction in brake pipe pressure below normal full charge value while said chamber is vented to move to another position for performing another control operation, a volume for storing fluid under pressure, a first one-way flow communication through which fluid under pressure may flow only from said brake pipe to said volume, a second one-way flow communication through which fluid under pressure may flow only from said volume to said brake pipe, and valve means subject to opposing pressures of fluid in said brake pipe and volume and controlling selective establishment of said communications and responsive to a slight reduction in brake pipe pressure below that in said volume to establish said second communication and vent said chamber and responsive to a subsequent slight increase in brake pipe pressure to establish said first communication and admit fluid under pressure to said chamber for causing said valve device to move to and be maintained in said one position irrespective of the rate and degree of increase in brake pipe pressure and until brake pipe pressure is subsequently reduced.

6. In a fluid pressure brake apparatus, an arrangement for controlling pressure of fluid in a chamber of a fluid pressure operated valve device for thereby influencing operation of the latter, said arrangement comprising a pipe in which pressure of fluid may be varied under control of the operator, a volume for storing fluid under pressure, a first one-way flow communication through which fluid under pressure may flow only from said pipe to said volume, a second one-way flow communication through which fluid under pressure may flow only from said volume to said pipe, and valve means subject opposingly to pressures of fluid in said pipe and volume and responsive to a slight reduction in pressure in said pipe below that in said volume to move to a first position for disestablishing said first communication and establishing said second communication and responsive to a subsequent slight increase in pressure in said pipe above that in said volume to move to a second position for disestablishing said second communication and establishing said first communication, said valve means being operative in one of its said positions to supply fluid under pressure to said chamber and in the other of its said positions to vent said chamber.

7. A fluid pressure brake apparatus comprising, in combination, a normally charged brake pipe, a brake cylinder, means defining a chamber, service valve means controlled by brake pipe pressure and brake cylinder pressure and fluid pressure in said chamber opposing a datum pressure corresponding to the normal charge value of brake pipe pressure, said service valve means being responsive to a reduction in brake pipe pressure below said datum pressure while said chamber is vented to provide in said brake cylinder fluid at a pressure substantially proportional to said reduction and responsive to a subsequent increase in brake pipe pressure while said chamber is vented to effect a graduated release of brake cylinder pressure to an extent corresponding to the extent of such increase in brake pipe pressure, and direct release valve means responsive to a slight reduction in brake pipe pressure below normal charge value to vent said chamber for permitting a graduated application of brakes according to the extent of reduction in brake pipe pressure and responsive to a subsequent slight increase in brake pipe pressure to supply fluid under pressure to said chamber for so modifying operation of said service valve means as to cause the latter to effect a complete direct release of brake cylinder pressure upon an increase in brake pipe pressure irrespective of the extent of such increase in brake pipe pressure.

8. A fluid pressure brake apparatus comprising, in combination, a normally charged brake pipe, a brake cylinder, means defining a chamber, service valve means controlled by brake pipe pressure and brake cylinder pressure and fluid pressure in said chamber opposing a datum pressure corresponding to the normal charge value of brake pipe pressure, said service valve means being responsive to a reduction in brake pipe pressure below said datum pressure while said chamber is vented to provide in said brake cylinder fluid at a pressure substantially proportional to said reduction and responsive to a subsequent increase in brake pipe pressure while said chamber is vented to effect a graduated release of brake cylinder pressure to an extent corresponding to the extent of such increase in brake pipe pressure, a volume for storing fluid under pressure, a first one-way flow communication through which fluid under pressure may flow only from said brake pipe to said volume, a second one-way flow communication through which fluid under pressure may flow only from said volume to said brake pipe, and direct release valve means responsive to a reduction in brake pipe presssure below the pressure in said volume to vent said chamber and disestablish said first communication and establish said second communication, said direct release valve means being responsive to a subsequent increase in brake pipe pressure above volume pressure to disestablish said second communication and establish said first communication and supply fluid under pressure to said chamber for so modifying operation of said service valve means as to cause the latter to promptly initiate and effect a complete direct release of brake cylinder pressure upon a slight increase in brake pipe pressure.

References Cited in the file of this patent
UNITED STATES PATENTS

| | | |
|---|---|---|
| 1,120,584 | Atwood | Dec. 8, 1914 |
| 1,881,221 | Neveu | Oct. 4, 1932 |
| 2,289,559 | Turek | July 14, 1942 |